W. F. DREW AND B. V. KORVIN-KROUKOVSKY.
PLANETARY TRANSMISSION.
APPLICATION FILED NOV. 7, 1919.

1,396,821.

Patented Nov. 15, 1921.
3 SHEETS—SHEET 1.

INVENTORS
William F. Drew
Boris V. Korvin Kroukovsky
BY
ATTORNEYS

W. F. DREW AND B. V. KORVIN-KROUKOVSKY.
PLANETARY TRANSMISSION.
APPLICATION FILED NOV. 7, 1919.
1,396,821.
Patented Nov. 15, 1921.
3 SHEETS—SHEET 2.
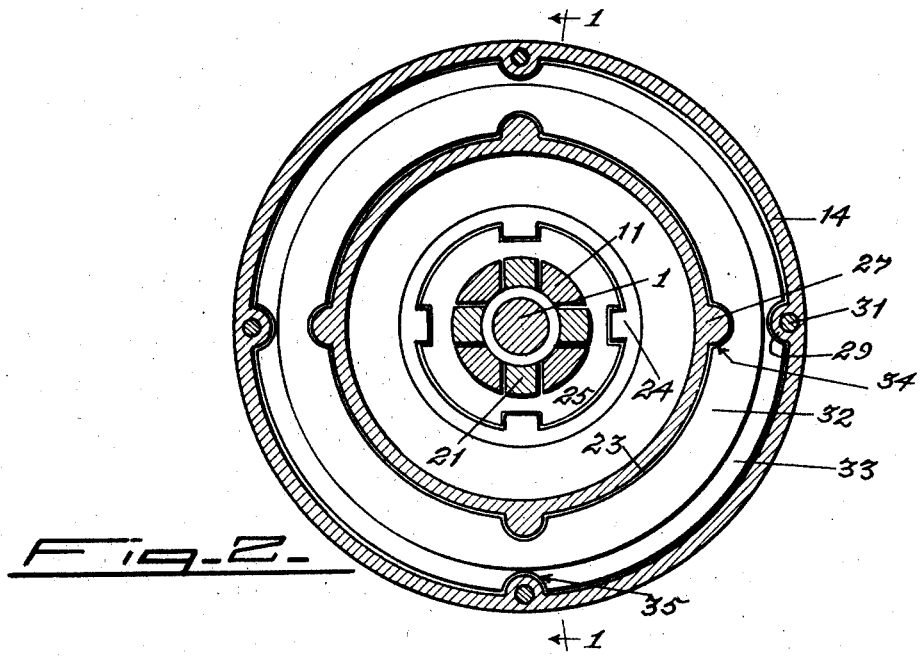
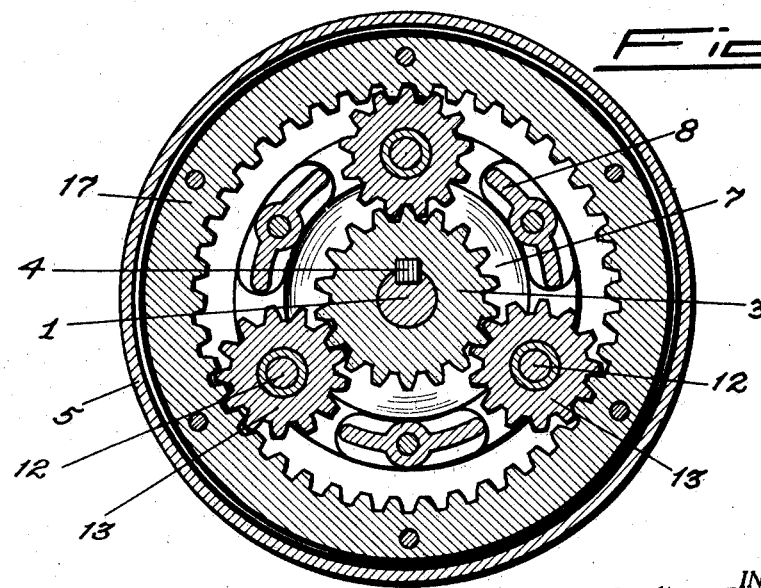
INVENTORS
William F. Drew
BY Boris V. Korvin Kroukovsky
Acker & Totten
ATTORNEYS W. F. DREW AND B. V. KORVIN-KROUKOVSKY.
PLANETARY TRANSMISSION.
APPLICATION FILED NOV. 7, 1919.
1,396,821.
Patented Nov. 15, 1921.
3 SHEETS—SHEET 3.
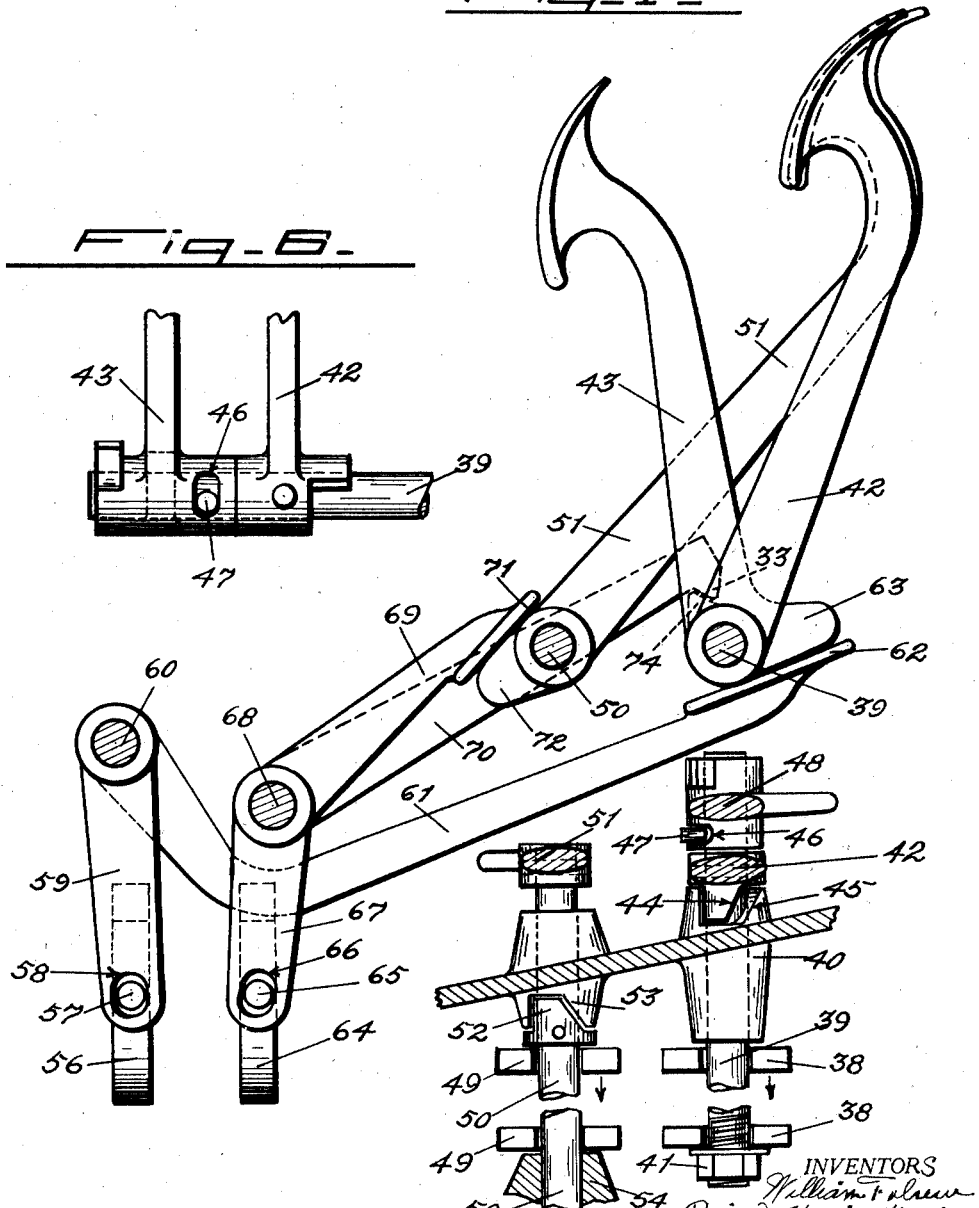

UNITED STATES PATENT OFFICE.

WILLIAM F. DREW AND BORIS V. KORVIN-KROUKOVSKY, OF SAN FRANCISCO, CALIFORNIA.

PLANETARY TRANSMISSION.

1,396,821.  Specification of Letters Patent.  Patented Nov. 15, 1921.

Application filed November 7, 1919. Serial No. 336,305.

*To all whom it may concern:*

Be it known that we, WILLIAM F. DREW and BORIS V. KORVIN-KROUKOVSKY, the said DREW a citizen of the United States, the said KROUKOVSKY a citizen of Russia, both residents of the city and county of San Francisco, State of California, have invented certain new and useful Improvements in Planetary Transmission, of which the following is a specification.

The present invention relates to a variable speed power transmitting mechanism of the planetary or epicyclic type.

The object of the invention is to provide a transmission mechanism of the described type, which is particularly adaptable for use in motor vehicles, and which may be controlled in the simplest possible manner. These objects are attained by providing a transmission having a minimum number of parts, and which, on account of its simplicity, can be made of sufficient strength to withstand the relatively hard use to which such devices are subjected, without being unduly large and heavy. A further object of the invention is to provide a transmission which can be constructed at a low cost.

Our transmission mechanism, although particularly adapted for use in motor vehicles, and so described hereinafter and illustrated herewith, is not limited to such use, but may be used in connection with any machinery in which such a device is necessary.

In order to more fully comprehend the invention, reference should be had to the accompanying sheets of drawings, wherein;

Fig. 2 is a transverse section taken in the direction of the arrows on the line 2—2 of Fig. 1.

Fig. 3 is a transverse section taken in the direction of the arrows on the line 3—3 of Fig. 1.

Fig. 4 is a side elevation of the control pedals and levers.

Fig. 5 is a sectional plan view of a portion of the control mechanism.

Fig. 6 is a detailed rear elevation of portions of two of the control pedals.

Figure 1:
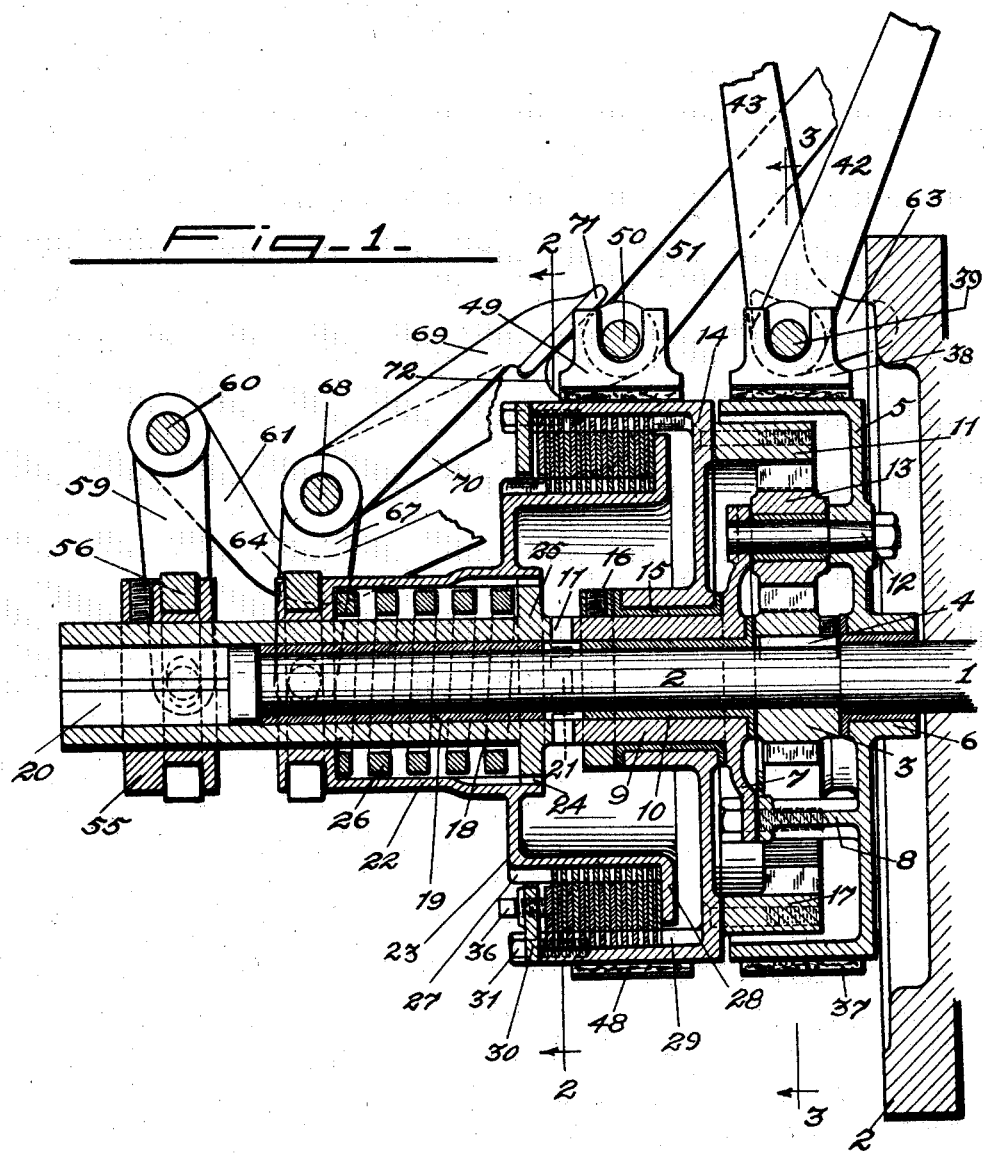
Figure 1 is a longitudinal vertical section through the center of our transmission.

In the drawings, the reference numeral 1, Figs. 1, 2 and 3, designates a driving shaft, shown in Fig. 1 as extending rearwardly from an engine fly-wheel 2. A driving gear 3, Figs. 1 and 3, is secured upon said shaft 1, as by means of a key 4. Surrounding and partially inclosing said driving gear 3 is a rotatable drum 5, hereinafter referred to as the reverse drum, which has a bearing upon the shaft 1 at 6. A spider 7 is secured to arcuate segmental webs 8 projecting rearwardly from the inner face of said drum 5, and said spider has a hub 9, Fig. 1, which has a bearing upon the shaft 1 at 10, and whose rear end is provided with one member of a power transmitting clutch, hereinafter referred to as the low-speed clutch, which may be of any well-known form or type, but which is here illustrated as a jaw-clutch, the said hub 9 being formed upon its rear end with jaws or teeth 11, Figs. 1 and 2. Spindles 12, Figs. 1 and 3, extending between and carried by said drum 5 and said spider 7, and positioned between the segmental webs 8, carry idler pinions 13 which are in constant mesh with the driving gear 3. In the drawings I have shown three of said pinions 13, but the number thereof is solely dependent upon structural considerations.

A second rotatable drum 14, Figs. 1 and 2, hereinafter called the low-speed drum, is journaled at 15 upon the hub 9 of the spider 7, and is retained thereon by a thrust collar 16, Fig. 1. Said low-speed drum 14 has secured to its forward face an internally toothed gear 17, which projects into the reverse drum 5 and meshes continuously with the idler pinions 13.

A hollow shaft 18, Fig. 1, hereinafter referred to as the driven shaft, has a bearing at 19, upon the end portion of the driving shaft 1, and at its rear end 20 is adapted for connection with the driven mechanism, not shown, as for example by means of a squared interior, as illustrated. The forward end of said driven shaft carries the other member of the said low-speed clutch, as for example, teeth or jaws 21, Figs. 1 and 2, adapted to engage the teeth 11 of the spider hub 9 to transmit power from said spider hub to said driven shaft in a forward direction at reduced speed. Said driven shaft is capable of being moved longitudinally upon the drive shaft 1, to permit engagement and disengagement of said low-speed clutch.

Surrounding a portion of the driven shaft 18, and slidably mounted thereon, is a hub 22 carrying a drum 23, Figs. 1 and 2, lying within the low speed drum 14. Said hub 22 is constrained to rotate with the driven shaft by means of inter-engaging jaws 24 formed upon the interior of said hub and the exterior of a flange 25 carried by the forward end of said driven shaft. A spring 26, positioned between the hub 22 and the driven shaft 18, maintains said parts normally in the positions shown in Fig. 1.

The drum 23 forms one member of a second clutch, hereinafter designated the reverse clutch, adapted to transmit power from the low-speed drum 14 and the internal gear 11 to the driven shaft 18 to cause said shaft to rotate in the reverse direction. Said clutch may be of any well-known form and construction, but for purposes of illustration I have illustrated a preferred form of friction clutch. The drum 23 is formed with a series of longitudinally disposed ribs 27, Figs. 1 and 2, and an end flange 28, Fig. 1.

The low speed drum 14 is likewise formed, upon its inner surface, with a series of longitudinally disposed ribs 29, Figs. 1 and 2, and carries an end flange or ring 30, Fig. 1, secured by means of screws 31. Between said flanges 28 and 30 are a series of alternately positioned friction disks or rings 32 and 33, the disks 32 being notched upon their inner periphery, as at 34, Fig. 2, to engage the ribs 27 of the clutch drum 23, and the disks 33 being notched upon their outer periphery, as at 35, to engage the ribs 29 of the low-speed drum 14. The spring 26, Fig. 1, normally holds said reverse clutch in engagement, by clamping the disks 32 and 33 between the flanges 28 and 30, and said spring also holds the teeth 11 and 21 of the lowspeed clutch in mutual engagement. Adjusting screws 36, Fig. 1, are provided in the flange 30 for securing the proper amount of pressure upon the reverse clutch disks.

The reverse drum 5 is encircled by a band 37, Fig. 1, preferably lined with some suitable friction material, and having forked ears 38, Figs. 1 and 5, upon its free ends. A transversely disposed oscillating shaft 39, journaled in a fixed member 4, Fig. 5, has its inner end portion lying within the notches of the ears 38, and carries an adjustable nut 41 upon its end. Said shaft 39 at its inner end carries two adjacent pedals 42 and 43, Figs. 1, 4, 5 and 6. The pedal 42 which will be referred to hereinafter as the brake pedal, is fixed upon said shaft 39, and has upon its hub an inclined cam face 44 which is adapted to ride upon a corresponding fixed cam surface 45, upon partial rotation of the pedal shaft 39, to move said shaft axially, thereby causing the ears 38 to be drawn together, and the band 37 to be tightened about the reverse drum 5. The outer pedal 43, hereinafter called the reverse pedal, is capable of slight oscillating movement upon the pedal shaft 39, having in its hub a circumferential slot 46, Figs. 5 and 6, in which lies a pin 47 projecting from said shaft. Thus any forward movement of the reverse pedal 43 rotates the shaft 39, but forward movement of the brake pedal 42 causes a slight rotation of said shaft without moving the reverse pedal 43, for a purpose to be hereinafter set forth.

The low-speed drum 14 is encircled by a lined band 48, Fig. 1, similar to the reverse band 37, and having forked ears 49, Figs. 1 and 5 fixed upon its free ends. An oscillatory transverse shaft 50, whose inner end portion lies in the notches of the ears 49, is journaled in the fixed member 40, Fig. 5, and has fixed to its outer end a pedal 51, Figs. 1, 4 and 5, which will be referred to hereinafter as the forward-speed pedal. Said pedal shaft 50 also carries a cam 52, Fig. 5, adapted to co-act, upon partial rotation of said shaft, with a fixed cam 53, to cause axial-movement of said shaft, thereby clamping the ears 49 between said cam member 52 and an opposite fixed member 54, and contracting the band 48 about the low-speed drum.

The driven shaft 18 has fixed to its rear end portion an annularly grooved collar 55, Fig. 1, in the groove of which rides a thrust yoke or partial ring 56, Figs. 1 and 4. Said ring has laterally projecting pins 57 which are freely engaged by holes 58 formed in the legs of a yoke 59, the latter being fixed upon a transverse oscillatory shaft 60, which has fixed to it a forwardly extending arm 61. Said arm at its forward end is formed with a foot 62, Fig. 4, adapted to ride against and be depressed by a cam 63 projecting from the hub of the reverse pedal 43 so that forward movement of said reverse pedal 43, by depressing the arm 61, causes the driven shaft 18 to be moved axially toward the rear to disengage the low-speed clutch described above.

Similarly, the hub 22 of the reverse clutch drum 23 is provided, near its rear end, with a groove in which rides a thrust yoke or partial ring 64, Figs. 1 and 4. Said ring has laterally projecting pins 65, freely engaged by holes 66 formed in the legs of a yoke 67, the latter being fixed upon a transverse oscillatory shaft 68, which has fixed to it two forwardly extending arms 69 and 70. The arm 69 has at its forward end a foot 71, adapted to ride against and be elevated by a cam 72 formed upon the hub of the forward-speed pedal 51, and the arm 70 has at its forward end a finger 73, Fig. 4, adapted to be engaged and elevated by a cam 74 formed upon the hub of the reverse pedal 43. Thus forward movement of either the forward-speed pedal 51 or the reverse pedal 43, by elevating the arms 69 and 70, causes the reverse clutch to be disengaged.

The operation of the device is as follows: Referring to Figs. 1 and 4 of the drawings, when the various parts are in the position shown, that is both bands 37 and 48 free from their respective drums 5 and 14, and both the reverse clutch and the low-speed clutch engaged, the entire mechanism rotates as a unit with the driving shaft 1, because both the internal gear 11 and the spider 7 are connected in driving relation with the driven shaft 18. This is the position of direct drive, or high-speed, in which the driven shaft rotates in unison and in the same direction with the driving shaft.

Forward movement of the forward-speed pedal 51 first disengages the reverse clutch by elevating the arm 69, thereby permitting the internal gear 11 to be rotated idly by the pinions 13. This is the neutral position, in which no power is transmitted from the driving shaft to the driven shaft. Further forward movement of said pedal 51 tightens the band 48 about the low-speed drum 14, by means of the cams 52 and 53, so that said drum 14, and the internal gear 11, are held stationary. The pinions 13 therefore travel around within said internal gear, causing the reverse drum 5 and the spider 7 to rotate, which drives the driven shaft 18, through the low-speed clutch, in a forward direction at a reduced speed, the difference in speed between driving and driven shafts being determined by the relative number of teeth on the driving gear 3 and the internal gear 11. This is the low-speed position. Return of the pedal 51 to its original position first releases the band 48 and then engages the reverse clutch, thus restoring the mechanism to the position of high-speed or direct drive.

Forward movement of the reverse pedal 43 first disengages the reverse clutch, by elevating the arm 70, thus placing the mechanism in its neutral position in which no power is transmitted. Further forward movement of said reverse pedal 43 disengages the low-speed clutch, by depressing the arm 61, then tightens the band 37 about the reverse drum 5, by means of the cam surfaces 44 and 45, and simultaneously reëngages the reverse clutch, the cam 74 having traveled beyond the finger 73 to allow the arm 70 to return to its normal position. The reverse drum 5, carrying the spindles 12 of the idler pinions 13, being held stationary, said pinions cause the internal gear 11 to rotate at a reduced speed in the reverse direction, the speed reduction being determined, as before, by the relative number of teeth on the driving gear 3 and the internal gear 11. This is the reverse position, in which power is transmitted from said internal gear 11 to the driven shaft 18 through the reverse clutch, the low-speed clutch remaining disengaged.

Rearward movement of the reverse pedal 43 toward its normal position first releases the band 37 and disengages the reverse clutch; then, while no power is being transmitted through the spider 7, further rearward movement of said pedal permits the engagement of the low-speed clutch, and finally reëngages the reverse clutch, thereby restoring the position of direct drive.

Forward movement of the brake pedal 42 tightens the band 37 about the drum 5 without disengaging either clutch. The band 37 thus acts as a simple brake, when contracted by means of said brake pedal 42, to check the speed of the entire mechanism when operating in the positions of direct drive or low-speed forward.

Although we have illustrated and described our transmission in its preferred form as having a friction clutch between the drum 14 and the driven shaft 18, and a positive jaw clutch between the spider 7 and said driven shaft, it is to be understood that any well-known type of clutch may be used at either of these points; according as the exigencies of the particular use to which the transmission is put may warrant. Similarly, other changes in form and construction may be made, within the scope of the claims hereto appended, without in any way departing from the spirit of the invention, or affecting the essential features thereof.

Having thus described our invention what we claim as new and desire to protect by Letters Patent is:

1. A planetary transmission comprising a driving shaft; a driving gear fixed thereon, a drum rotatably mounted upon said shaft; an idler pinion carried by said drum and positioned to mesh with said driving gear; a driven gear adapted to mesh with said pinion; a driven shaft; a clutch for connecting said drum with said driven shaft; a second clutch for connecting said driven gear with said driven shaft; means for independently holding said drum and said driven gear stationary; and controlling devices for simultaneously engaging both of said clutches, for simultaneously engaging said drum-clutch and said driven gear-holding means, and for simultaneously engaging said driven gear-clutch and said drum-holding means, at will.

2. A planetary transmission comprising a driving shaft; a driving gear fixed thereon; a drum rotatably mounted about said shaft; an idler pinion carried by said drum and adapted to mesh with said driving gear; a driven gear adapted to mesh with said pinion; a driven shaft; a pair of clutches for connecting said drum and said driven gear with said driven shaft, one of said clutches being a friction clutch; means for independently holding said drum and said driven gear stationary; and associated controlling devices for simultaneously engaging both of said clutches, for simultaneously engaging the driven clutch and said driven gear-holding means; for simultaneously engaging the driven gear clutch and said drum-holding means, and for temporarily releasing the friction clutch prior to the engagement of the other clutch.

3. A planetary transmission comprising a driving shaft; a driving gear fixed thereon; a drum rotatably mounted upon said shaft adjacent to said driving gear; a spider rotatably mounted upon said shaft on the other side of said driving gear and secured to said drum; a spindle extending between said drum and said spider; an idler pinion mounted on said spindle and adapted to mesh with said driving gear; a driven gear rotatably mounted about said shaft and adapted to mesh with said pinion; a hollow driven shaft journaled upon the end portion of the driving shaft; releasable clutch for connecting said spider and said driven gear with said driven shaft; and independent means for holding said drum and said driven gear stationary.

4. A planetary transmission comprising a driving shaft; a driving gear fixed thereon; a drum rotatably mounted upon said shaft adjacent to said driving gear; a spider having a hub portion rotatably mounted upon said shaft on the other side of said driving gear and secured to said drum; a spindle extending between said drum and said spider; an idler pinion mounted upon said spindle and adapted to mesh with said driving gear; a driven gear rotatably mounted upon the hub of said spider and adapted to mesh with said pinion; a hollow driven shaft rotatably and slidably mounted upon the end portion of said driving shaft; co-acting clutch members formed upon the adjacent ends of said spider hub and said driven shaft; means for sliding said driven shaft to engage said clutch members; means for connecting said driven gear with said driven shaft; and means for holding said drum and said driven gear stationary.

5. A planetary transmission comprising a driving shaft; a driving gear fixed thereon; a drum rotatably mounted upon said shaft adjacent to said driving gear; a spider having a hub portion rotatably mounted upon said shaft on the other side of said driving gear and secured to said drum; a spindle extending between said drum and said spider; an idler pinion mounted upon said spindle and adapted to mesh with said driving gear; a second drum rotatably mounted upon the hub of said spider; a driven internal gear secured to said second drum, extending into the first drum and adapted to mesh with said idler pinion; a hollow driven shaft rotatably and slidably mounted upon the end portion of said driving shaft; co-acting clutch members formed upon the adjacent ends of said spider hub and said driven shaft; means for sliding said driven shaft to engage said clutch members; a sleeve slidably mounted upon said driven shaft and constrained to rotate therewith; co-acting clutch members carried by said sleeve and the second drum; means for sliding said sleeve to engage said clutch members; and means for holding said drums stationary.

In testimony whereof we have signed our names to this specification in the presence of two subscribing witnesses.

WILLIAM F. DREW.
BORIS V. KORVIN-KROUKOVSKY.

Witnesses:
HARRY A. TOTTEN,
D. B. RICHARDS.